United States Patent
Tamitsuji et al.

(10) Patent No.: US 8,656,735 B2
(45) Date of Patent: Feb. 25, 2014

(54) METHOD FOR TREATING SURFACE OF OXIDE GLASS WITH FLUORINATING AGENT

(75) Inventors: Chikaya Tamitsuji, Chiyoda-ku (JP); Kunio Watanabe, Chiyoda-ku (JP)

(73) Assignee: Asahi Glass Company, Limited, Tokyo (JP)

(*) Notice: Subject to any disclaimer, the term of this patent is extended or adjusted under 35 U.S.C. 154(b) by 104 days.

(21) Appl. No.: 12/640,199

(22) Filed: Dec. 17, 2009

(65) Prior Publication Data

US 2010/0089096 A1   Apr. 15, 2010

Related U.S. Application Data

(63) Continuation of application No. PCT/JP2008/061361, filed on Jun. 20, 2008.

(30) Foreign Application Priority Data

Jun. 20, 2007  (JP) .................. 2007-162921
Jul. 23, 2007  (JP) .................. 2007-191009

(51) Int. Cl.
   *C03C 15/00*   (2006.01)
(52) U.S. Cl.
   USPC .......................... 65/30.13; 65/30.1
(58) Field of Classification Search
   USPC ........................ 65/30.1, 30.13, 32.1
   See application file for complete search history.

(56) References Cited

U.S. PATENT DOCUMENTS

| | | | |
|---|---|---|---|
| 2,982,053 A * | 5/1961 | Elmer | 501/54 |
| 3,314,772 A * | 4/1967 | Poole et al. | 65/30.13 |
| 3,709,672 A * | 1/1973 | De Santis et al. | 65/30.1 |
| 4,833,001 A | 5/1989 | Kijima et al. | |
| 5,039,326 A * | 8/1991 | Day et al. | 424/1.29 |
| 5,292,354 A * | 3/1994 | Hecq et al. | 65/31 |
| 6,077,799 A | 6/2000 | Dejneka et al. | |
| 2007/0056662 A1 * | 3/2007 | Fagan et al. | 148/712 |

FOREIGN PATENT DOCUMENTS

| | | |
|---|---|---|
| EP | 0 691 312 A1 | 1/1996 |
| EP | 1 262 456 A1 | 12/2002 |
| JP | 56-088320 | 7/1981 |
| JP | 59-6261 | 2/1984 |

(Continued)

OTHER PUBLICATIONS

C. Smith et al., "Properties and production of F-doped silica glass", Journal of Fluorine Chemistry vol. 122 (2003) pp. 81-86.

(Continued)

*Primary Examiner* — Matthew Daniels
*Assistant Examiner* — Lisa Herring
(74) *Attorney, Agent, or Firm* — Oblon, Spivak, McClelland, Maier & Neustadt, L.L.P.

(57) ABSTRACT

To provide a novel fluorination treatment method whereby the surface of oxide glass can be treated for fluorination at low cost and with excellent adhesiveness.

A method for treating the surface of oxide glass, which comprises contacting the surface of oxide glass with a gas of a fluorinating agent or a mixed gas having a fluorinating agent diluted with an inert gas, wherein the fluorinating agent is an elemental fluorine, or a fluorine compound capable of cleaving a bond between an oxygen atom and a metal atom in the framework of the oxide glass and forming a bond between a fluorine atom and the metal atom; and the concentration of hydrogen fluoride at the surface of oxide glass with which the fluorinating agent is in contact, is controlled to be at most 1 mol %.

15 Claims, 2 Drawing Sheets

(56) References Cited

FOREIGN PATENT DOCUMENTS

| | | |
|---|---|---|
| JP | 59-232934 | 12/1984 |
| JP | 60-36343 | 2/1985 |
| JP | 64-037432 | 2/1989 |
| JP | 64-37718 | 2/1989 |
| JP | 2000-21300 | 1/2000 |
| JP | 2001-253729 | 9/2001 |
| JP | 2002-539066 | 11/2002 |
| JP | 2007-284270 | 11/2007 |

OTHER PUBLICATIONS

U.S. Appl. No. 12/904,236, filed Oct. 14, 2010, Saitou, et al.
Extended European Search Report issued Nov. 15, 2012 in Patent Application No. 08765781.3.

* cited by examiner

METHOD FOR TREATING SURFACE OF OXIDE GLASS WITH FLUORINATING AGENT

TECHNICAL FIELD

The present invention relates to a method for treating the surface of oxide glass with a fluorinating agent.

BACKGROUND ART

There is a case where the surface of oxide glass such as soda lime glass, synthetic quartz glass, phosphate glass, borosilicate glass or alkali-free glass is desired to be treated for fluorination. For example, there is a case where the surface of such oxide glass is desired to be treated for fluorination to impart an anti-fouling property, hydrophilicity, adhesive property, moisture-proof property, anti-reflection performance, etc. to the surface of such oxide glass. In this specification, "the surface of oxide glass is treated for fluorination" means a treatment to introduce fluorine to a portion in a certain depth from the surface of oxide glass, for example, to a portion in a depth of about 2,000 nm from the surface (hereinafter, referred to as "the surface layer").

As a method for treating the surface of oxide glass for fluorination, a method is known to fix or dope fluorine on the oxide glass surface by a chemical vapor deposition (CVD) method, a physical vapor deposition (PVD) method, a gas deposition method or the like (Patent Document 1, Patent Document 2).

However, such a method utilizes a vapor deposition method, whereby there is a problem such that the adhesion of fluorine to the oxide glass is poor.

Further, the material which can be vapor-deposited is rather limited, and an expensive material is obliged to be used, whereby the production cost tends to be high.

Further, Patent Document 3 discloses a technique of adsorbing fluorine on the surface of a glass substrate in a method for producing an electron emission element. However, in Patent Document 3, the procedure of adsorbing fluorine on the surface of a glass substrate is carried out under a condition of a low reaction rate under a very low pressure at a level of $1.3 \times 10^{-2}$ Pa, whereby it takes time for the fluorination treatment, and in addition, as the purpose of Patent Document 3 is to adsorb fluorine on the surface of a glass substrate, the condition is considered to be such that no fluorination reaction will proceed between fluorine and the glass substrate surface or a fluorination reaction proceed only at the outermost surface of the glass substrate. Accordingly, the fluorine atom and the glass substrate have no chemical bond, or even if the fluorine atom and the glass substrate have a chemical bond, such a bond is only at the outermost surface of the glass substrate, whereby there is a problem such that the intended effects cannot sufficiently be obtained, or the intended effect cannot be maintained for a long period of time for such a reason that the adsorbed fluorine is likely to be easily eliminated.

Patent Document 1: JP-A-2002-539066
Patent Document 2: JP-A-2001-253729
Patent Document 3: JP-A-2000-21300

DISCLOSURE OF THE INVENTION

Object to be Accomplished by the Invention

In order to solve the above-mentioned problems of the prior art, the present invention has an object to provide a novel method for fluorination treatment whereby the surface of oxide glass can be treated for fluorination at low cost and with excellent adhesiveness.

Means to Accomplish the Object

A method of contacting the surface of oxide glass with a gas of a fluorinating agent or a mixed gas having a fluorinating agent diluted with an inert gas (in this specification, they will generally be referred to as "a gaseous fluorinating agent") is considered to be a preferred method as a method for treating the surface of oxide glass for fluorination, since it can be carried out under conditions close to normal pressure and normal temperature and can be carried out at low cost as compared with a vapor deposition method and yet fluorination treatment excellent in adhesiveness can be carried out.

In this specification, the fluorinating agent means a substance which contains a fluorine atom as a part of its chemical structure and which is capable of cleaving a bond between an oxygen atom and a metal atom in the framework of oxide glass and forming a bond between the fluorine atom and the metal atom, or a substance which contains a fluorine atom as a part of its chemical structure as a result of decomposition by e.g. heat and which is capable of cleaving a bond between an oxygen atom and a metal atom in the framework of oxide glass and forming a bond between the fluorine atom and the metal atom.

However, the present inventors have found that if the surface of oxide glass is contacted with a gaseous fluorinating agent, hydrogen fluoride present at the surface of the oxide glass presents an adverse effect. That is, it has been found that if hydrogen fluoride is present at the surface of the oxide glass, the surface properties of the oxide glass tend to be deteriorated by the excessive etching action by hydrogen fluoride. For example, by the excessive etching action by hydrogen fluoride, the surface of the oxide glass is roughened, and the light transmittance of the oxide glass tends to be decreased. This is problematic for oxide glass for applications where transparency is required. Further, there is also a problem such that by the excessive etching action, the glass framework is likely to be cleaved relatively excessively, whereby the strength of the surface layer having fluorine introduced tends to be decreased.

In a case where hydrogen fluoride is used as the fluorinating agent, hydrogen fluoride present at the surface of the oxide glass will naturally be problematic. However, even in a case where a fluorinating agent other than hydrogen fluoride is used, hydrogen fluoride will be formed by a side reaction by inclusion of moisture or a volatile organic compound, whereby hydrogen fluoride present on the surface of oxide glass will be problematic.

As a result of an extensive study, the present inventors have found it possible to treat the surface of oxide glass for fluorination at low cost and with excellent adhesiveness without deterioration of the surface properties by an excessive etching action, by controlling the concentration of hydrogen fluoride at the surface of oxide glass to be at most a certain specific value when contacting the surface of oxide glass with the gaseous fluorinating agent.

The present invention is based on the above discovery and provides a method for treating the surface of oxide glass, which comprises contacting the surface of oxide glass with a gas of a fluorinating agent or a mixed gas having a fluorinating agent diluted with an inert gas, wherein the fluorinating agent is an elemental fluorine, or a fluorine compound capable of cleaving a bond between an oxygen atom and a metal atom in the framework of the oxide glass and forming a bond between a fluorine atom and the metal atom; and the concentration of hydrogen fluoride at the surface of oxide glass with which the fluorinating agent is in contact, is controlled to be at most 1 mol %.

In the method for treating the surface of oxide glass of the present invention, it is preferred that the concentration of hydrogen fluoride at the surface of oxide glass with which the fluorinating agent is in contact, is controlled to be at most 1 mol % by carrying out the procedure of contacting the surface of oxide glass with a gas of a fluorinating agent or a mixed gas having a fluorinating agent diluted with an inert gas, in a closed container containing the gas of a fluorinating agent or the mixed gas having a fluorinating agent diluted with an inert gas, and a solid metal fluoride.

Further, in the method for treating the surface of oxide glass of the present invention, it is preferred that the concentration of hydrogen fluoride at the surface of oxide glass with which the fluorinating agent is in contact, is controlled to be at most 1 mol % by carrying out a procedure of contacting the surface of oxide glass with the fluorinating agent in a gas phase by setting the oxide glass in a pipe line in which the gas of a fluorinating agent or the mixed gas having a fluorinating agent diluted with an inert gas, continuously flows.

Effects of the Invention

According to the method for treating the surface of oxide glass of the present invention, it is possible to treat the surface of oxide glass for fluorination at low cost and with excellent adhesiveness without deterioration of the surface properties by an excessive etching action.

According to the method for treating the surface of oxide glass of the present invention, it is possible to impart desired properties to the surface of oxide glass by introducing fluorine to the surface of the oxide glass. For example, it is possible to impart an antifouling property to the surface of oxide glass by improving the hydrophilicity of the surface of the oxide glass.

Further, by introducing fluorine to the surface of oxide glass, it is possible to lower the softening point of oxide glass in the surface layer. A method has been proposed wherein fine irregularities present on the surface of a glass substrate, for example, scratches present on the surface of a glass substrate for a flat panel display, are flattened by irradiation with a laser (JP-A-2007-284270). When the surface of a glass substrate to which such a method is to be applied, is preliminarily treated by the method of the present invention, it is possible to lower the irradiation energy of the laser beam applied to the surface of the glass substrate. By lowering the irradiation energy of the laser beam applied to the surface of the glass substrate, it is possible to prevent a problem such as deformation of the glass substrate, formation of a thermal stress at the glass substrate, local evaporation of the glass substrate surface or the like.

Further, in a case where the oxide glass to which the method of the present invention is applied, is fine particulate glass frit, a decrease in the softening point of oxide glass at the surface layer brings about a decrease in the softening point of the entire oxide glass constituting the glass frit, whereby the firing temperature of the glass frit can be lowered. The principle as to why the decrease in the softening point of oxide glass at the surface layer brings about a decrease in the softening point of the entire oxide glass constituting the glass frit, is not clearly understood, but it is considered that as fluorine having a low surface resistance is introduced, the melt viscosity lowers, and the fluidity of the entire oxide glass constituting the glass frit is improved, whereby the softening point will decrease.

MEANINGS OF SYMBOLS

Figure 1:
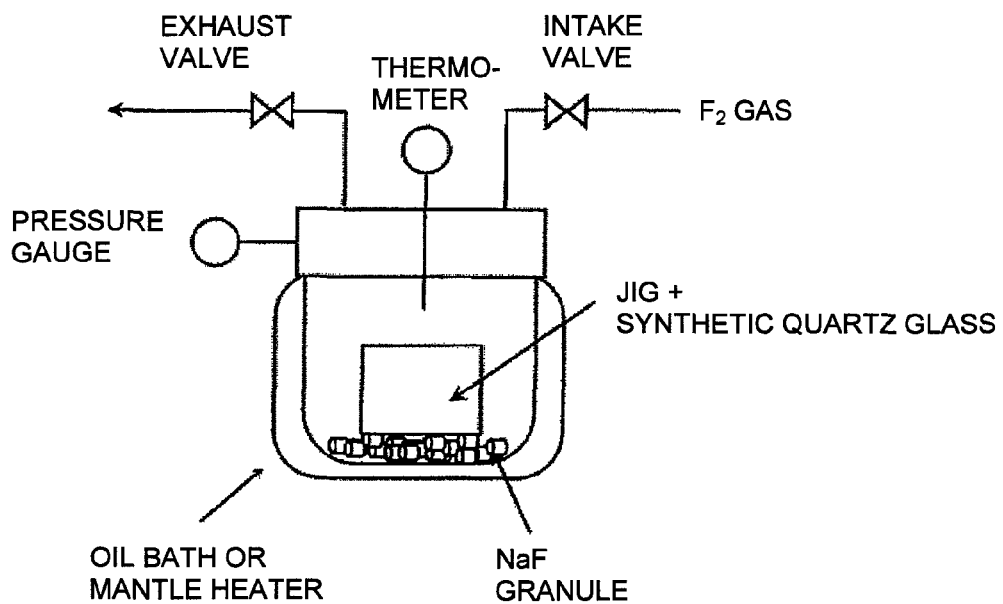
FIG. 1 is a schematic view of an apparatus used for contacting the surface of oxide glass with a gaseous fluorinating agent in Example 1.

1: Pipe line
2: Heater
3: Cooling means
10: Oxide glass

BEST MODE FOR CARRYING OUT THE INVENTION

Now, the present invention will be described in detail.
Definitions, Etc
Oxide Glass In the present invention, "oxide glass" is glass containing an oxide as the main framework component, and specifically, it may, for example, be soda lime glass, synthetic quartz glass, phosphate glass or borosilicate glass. Further, even with oxide glass having fluorine preliminarily introduced, it is possible to form a surface layer having fluorine introduced in a larger amount than the interior of the glass oxide, by the surface treatment method of the present invention.

The shape of oxide glass to be surface-treated by the present invention is not particularly limited. For example, it may be a sheet form like a lens, a plate form like a glass substrate, a polyhedron such as a prism, or a rod form such as an optical fiber. Otherwise, it may be particulate like frit glass.

Further, at the time of applying surface treatment to oxide glass, the surface treatment may be applied to the entire surface of the oxide glass, or the surface treatment may be applied only to a part of the surface of the oxide glass. In the latter case, the surface treatment may be applied in such a state that the portion not desired to be surface-treated, is masked.

Fluorinating Agent

As mentioned above, in this specification, the fluorinating agent is a substance which contains a fluorine atom as a part of its chemical structure and which is capable of cleaving a bond between an oxygen atom and a metal atom in the framework of oxide glass and forming a bond between the fluorine atom and the metal atom, or a substance which contains a fluorine atom as a part of its chemical structure as a result of decomposition by e.g. a heat and which is capable of cleaving a bond between an oxygen atom and a metal atom in the framework of oxide glass and forming a bond between the fluorine atom and the metal atom.

A specific example of such a fluorinating agent may be an elemental fluorine ($F_2$), or a fluorine compound capable of cleaving a bond between an oxygen atom and a metal atom in the framework of oxide glass and forming a bond between a fluorine atom and the metal atom (in this specification, such a fluorine compound will hereinafter be referred to as a "reactive fluorine compound"). A specific example of such a reactive fluorine compound may be silicon tetrafluoride ($SiF_4$), phosphorus pentafluoride ($PF_5$), phosphorus trifluoride ($PF_3$), boron trifluoride ($BF_3$), nitrogen trifluoride ($NF_3$) or chlorine trifluoride ($ClF_3$). Further, in the method of the present invention, in order to control the hydrogen fluoride concentration at the surface of oxide glass to be at most 1.0 mol %, hydrogen fluoride is not used as the fluorinating agent. These fluorinating agents may be used alone, or a mixture of two or more of them may be used. Among the above-mentioned fluorinating agents, an elemental fluorine is most preferred, since the reactivity is high as it is, whereby the apparatus can be simplified, and the reaction time can be shortened.

In the method of the present invention, such a fluorinating agent is contacted to the surface of oxide glass, as a gaseous fluorinating agent, i.e. as a gas of a fluorinating agent, or as a mixed gas having a fluorinating agent diluted with a gas inert to the fluorination reaction or to the oxide glass. The inert gas to be used for the mixed gas may specifically be nitrogen gas, or a rare gas such as helium gas or argon gas. However, if moisture is included in the inert gas, it may react with the fluorinating agent at the time of using as a mixed gas thereby to form hydrogen fluoride, and therefore, a due care is necessary. From this viewpoint, the dew point of the inert gas is preferably at most $-10°$ C., more preferably at most $-40°$ C., particularly preferably at most $-60°$ C.

From the viewpoint of easy control of the reaction and economical efficiency, the gaseous fluorinating agent is used preferably in the form of a mixed gas having the fluorinating agent diluted with an inert gas, particularly preferably in the form of a mixed gas having the fluorinating agent diluted with nitrogen gas, most preferably in the form of a mixed gas having an elemental fluorine diluted with nitrogen gas.

In a case where it is used in the form of a mixed gas having an elemental fluorine diluted with nitrogen gas, the concentration of the elemental fluorine is preferably from 100 mol ppm to 50 mol %, more preferably from 1,000 mol ppm to 20 mol %, from the viewpoint of easy control of the reaction and economical efficiency. If it is less than 100 mol ppm, the reaction rate tends to be low, and the treatment time tends to be long. On the other hand, if it exceeds 50 mol %, the reaction rate tends to be high, and control of the reaction tends to be difficult. Also in a case where another fluorinating agent is to be used, it is preferred to use it as a fluorinating agent diluted to such a concentration.

Discovery According to the Present Invention

In the method of the present invention, at the time of contacting the surface of oxide glass with a gaseous fluorinating agent, the concentration of hydrogen fluoride at the surface of oxide glass with which the fluorinating agent is in contact, is controlled to be at most 1 mol %, whereby it is possible to fluorinate the surface of oxide glass without deterioration of the surface properties by an excessive etching action.

For example, in the case of a silica type oxide glass containing silicon atoms in its framework, when the surface of the oxide glass is contacted with the gaseous fluorinating agent, a bond between an oxygen atom and a metal atom in the framework of oxide glass, i.e. a structurally unstable site among Si—O bonds, is cleaved to form a Si—F bond. At a site where a Si—F bond is formed, $SiO_2$ in the oxide glass is converted to $SiO_xF_y$. Thus, fluorine is introduced to the surface of oxide glass. Here, (2x+y) is substantially 4, and as the degree of fluorination proceeds (as the concentration of fluorine atoms increases), x decreases, and y increases. The fluorinating agent diffuses from the surface to the interior of oxide glass, so that silicon atoms in the interior will also be fluorinated to a certain depth. Interfusion of the fluorinating agent from the surface to the interior is considered to be attributable to diffusion. Accordingly, the degree of fluorination (the degree of introduction of fluorine) is usually highest at the surface and gradually decreases from the surface to the interior (i.e. the concentration of fluorine atoms gradually decreases in the direction of depth from the surface). Further, in a case where the oxide glass has atoms or groups other than oxygen atoms bonded to silicon atoms (for example, hydroxy groups), a reaction for their substitution by fluorine atoms is also considered to take place.

It is considered that if all of Si—O bonds of silicon atoms present in the surface of oxide glass are substituted by fluorine atoms by the introduction of fluorine, such silicon atoms will be gasified in the form of $SiF_4$ and will be eliminated from the surface. Such elimination of the silicon atoms from the surface results in erosion (etching) of the surface.

Also in the case of oxide glass containing phosphorus atoms or boron atoms as metal atoms in the framework, in the same manner as in the case of Si—O bonds, when the surface of oxide glass is contacted with a fluorinating agent, P—O bonds or B—O bonds at a structurally unstable site will be cleaved, and P—F bonds or B—F bonds will, for example, be formed. And, if all of the P—O bonds of phosphorus atoms or B—O bonds of boron atoms at the surface of oxide glass are substituted by fluorine atoms by the introduction of fluorine, such phosphorus atoms and boron atoms are considered to be gasified in the form of phosphorus pentafluoride ($PF_5$) and boron trifluoride ($BF_3$), respectively, and eliminated from the surface. Such elimination of phosphorus atoms or boron atoms from the surface results in erosion (etching) of the surface.

Also in the case of oxide glass other than such synthetic quartz glass, when such glass has atoms or groups other than oxygen atoms bonded to metal atoms constituting the framework of glass (for example, hydroxy groups), a reaction for their substitution by fluorine atoms is considered to take place.

However, if such an etching action is slight, for example, if it is to such an extent to form fine voids (e.g. voids with a diameter or depth of at most 200 nm, more preferably voids with a diameter or depth of at most 100 nm) on the surface of oxide glass, the surface properties of the oxide glass will not be deteriorated, and may rather present surface properties desirable to oxide glass.

For example, when fine voids are formed on the surface of oxide glass by an etching action, the refractive index of the surface of the oxide glass is considered to become lower than the interior of the oxide glass. Further, also by the introduction of fluorine to the surface of the oxide glass, the refractive index of the surface of the oxide glass becomes lower than the interior of the oxide glass. By these effects, the surface of the oxide glass contacted with the gaseous fluorinating agent will have a refractive index which is lower than the interior of the oxide glass. It is thereby expected that the light transmittance of the oxide glass will be improved.

Further, when fine voids are formed on the surface of oxide glass by an etching action, it is considered that wettability of the surface of the oxide glass will be improved. Further, it is considered that by the introduction of fluorine to the surface of the oxide glass, there will be a state where polar groups are present in the surface of the oxide glass.

Further, depending upon the composition of oxide glass, there is a case where by the contact with the gaseous fluorinating agent, a fluoride having a high affinity to water will be formed in the surface of the oxide glass.

By these effects, the surface of oxide glass contacted with the gaseous fluorinating agent is expected to have the hydrophilicity improved.

By the improvement in the hydrophilicity of the surface of the oxide glass, it is expected that the antifouling property of the surface will be improved.

However, if an excessive etching action takes place, the surface properties of oxide glass will be deteriorated, such being problematic. For example, if an excessive etching action takes place, surface roughening of the oxide glass will result, and the light transmittance of the oxide glass will become low, such being problematic in the case of oxide glass for applications where transparency is required. Further, there is also a problem that by the excessive etching action, the glass framework will be cleaved relatively excessively, whereby the strength of the surface layer having fluorine introduced tends to become low.

Accordingly, in order to prevent an excessive etching action, it is necessary to control the conditions at the time of contacting the surface of oxide glass with the gaseous fluorinating agent, e.g. the conditions such as the temperature of the gaseous fluorinating agent, the pressure of the gaseous fluorinating agent (the total pressure in a case where a gas of a fluorinating agent is used, or the partial pressure of the fluorinating agent in a case where a mixed gas is used), and the time for contacting the surface of the oxide glass with the gaseous fluorinating agent.

Further, as a matter of course, it is necessary to control the above described conditions also for controlling the degree of introduction of fluorine to the surface of oxide glass. For example, the concentration of fluorine atoms in the surface of oxide glass can be made high by increasing the temperature of the gaseous fluorinating agent and/or by increasing the pressure of the gaseous fluorinating agent. Further, it is possible to deepen the depth for introduction of fluorine by lowering the temperature of the gaseous fluorinating agent and prolonging the time for contacting the surface of oxide glass with the gaseous fluorinating agent, or by lowering the pressure of the gaseous fluorinating agent and prolonging the time for contacting the surface of oxide glass with the gaseous fluorinating agent.

However, if the concentration of hydrogen fluoride having a strong etching action is high at the surface of oxide glass, it is not possible to control the degree of the etching action and to prevent generation of an excessive etching action, by the above described conditions.

Accordingly, at the time of contacting the surface of oxide glass with the gaseous fluorinating agent, it is necessary to maintain the concentration of hydrogen fluoride at a low state at the surface of the oxide glass with which the fluorinating agent is in contact. Specifically, at the time of contacting the surface of oxide glass with the gaseous fluorinating agent, it is necessary to control hydrogen fluoride to be at most 1 mol % at the surface of the oxide glass with which the fluorinating agent is in contact.

Here, the concentration of hydrogen fluoride at the surface of oxide glass can be measured by an infrared spectroscopy.

In the present invention, it is more preferred to control the concentration of hydrogen fluoride to be at most 0.5 mol % at the surface of the oxide glass with which the gaseous fluorinating agent is in contact.

In the present invention, in order to control the concentration of hydrogen fluoride to be at most 1 mol % at the surface of the oxide glass with which the gaseous fluorinating agent is in contact, the following first or second embodiment of the present invention may be carried out.

First Embodiment of the Present Invention

In the first embodiment of the present invention, the concentration of hydrogen fluoride at the surface of oxide glass with which the gaseous fluorinating agent is in contact, is controlled to be at most 1 mol % by carrying out the procedure of contacting the surface of oxide glass with the gaseous fluorinating agent in a closed container containing the gaseous fluorinating agent and a solid metal fluoride.

In the first embodiment of the present invention, the concentration of hydrogen fluoride at the surface of oxide glass with which the fluorinating agent is in contact, is controlled to be at most 1 mol %, by letting the solid metal fluoride adsorb hydrogen fluoride formed by a side reaction from the fluorinating agent by inclusion of moisture or a volatile organic compound.

The solid metal fluoride to be used is not particularly limited, and it is preferably one selected from the group consisting of alkali metal fluorides, alkaline earth metal fluorides and mixtures thereof. Among them, sodium fluoride is particularly preferred. The shape of the solid metal fluoride is not particularly limited, and an optional shape suitable for placing in the closed container, may be selected.

In the first embodiment of the present invention, the pressure of the fluorinating agent in the closed container is preferably within a range of from 0.1 Pa to 500 kPa. If the pressure of the fluorinating agent is less than 0.1 Pa, the rate of the fluorinating reaction tends to be practically too low in many cases. On the other hand, if the pressure of the fluorinating agent exceeds 500 kPa, control of the fluorinating reaction may sometimes become difficult, or use of such an excess fluorinating agent leads to a problem of an increase in the production cost. The above-mentioned pressure of the fluorinating agent means, in the case of the gas of the fluorinating agent, the pressure of the gas of the fluorinating agent, or, in the case of a mixed gas having the fluorinating agent diluted with an inert gas, the partial pressure of the fluorinating agent in the mixed gas (the same applies hereinafter).

The pressure of the fluorinating agent is more preferably from 1 Pa to 200 kPa, further preferably from 1 Pa to 100 kPa.

In a case where it is used as a mixed gas diluted with an inert gas, the total pressure of the mixed gas in the closed container is not particularly limited. However, as the total pressure is higher, it is necessary to make the closed container to have higher pressure resistance, whereby the cost for the apparatus increases. On the other hand, if the total pressure is so low that it is lower than the atmospheric pressure, the exterior air will leak into the closed apparatus and thus is likely to inhibit the fluorination reaction. From the viewpoint of the cost and safety, the total pressure of the mixed gas is preferably from 0 to 1 MPa (gauge pressure).

The temperature of the gaseous fluorinating agent is not particularly limited, but it is usually preferably within a range of from $-50$ to $300°$ C. in consideration of efficiency in controlling the reaction. If it is lower than $-50°$ C., the reaction tends to be slow and not practical in many cases. On the other hand, the ability to absorb hydrogen fluoride of the solid metal fluoride tends to be low at a high temperature, and if it exceeds $300°$ C., it becomes difficult to control the concentration of hydrogen fluoride to at most 1 mol % at the surface of oxide glass with which the fluorinating agent is in contact. The temperature of the gaseous fluorinating agent is more preferably from $-20$ to $250°$ C., further preferably from 60 to $200°$ C.

The temperature of oxide glass may be the same or different from the temperature of the gaseous fluorinating agent. For example, in a case where the oxide glass is placed on a substrate having good thermal conductivity, and the gaseous fluorinating agent is contacted while cooling the substrate, the diffusion rate of fluorine in the oxide glass decreases, and as compared with a case where no such cooling is carried out, the concentration gradient of fluorine in the oxide glass can be changed.

The time for contacting the surface of oxide glass with the gaseous fluorinating agent is preferably from one minute to one week, particularly preferably from 10 minutes to two days.

In the gaseous fluorinating agent, in addition to the above inert gas, other substances may co-exists, such being acceptable. There may be a case where it is preferred to use a substance to promote the decomposition of the fluorinating agent. With a view to promoting the decomposition of the fluorinating agent or promoting the fluorination, light such as ultraviolet light may be used. In this respect, the same applies to the following second embodiment of the present invention.

Second Embodiment of the Present Invention

In the second embodiment of the present invention, the concentration of hydrogen fluoride at the surface of oxide glass with which the fluorinating agent is in contact, is controlled to be at most 1 mol % by carrying out a procedure of contacting the surface of oxide glass with the gaseous fluorinating agent by setting the oxide glass in a pipe line in which the gaseous fluorinating agent continuously flows.

In the second embodiment of the present invention, the concentration of hydrogen fluoride at the surface of oxide glass is controlled to be at most 1 mol % by carrying off hydrogen fluoride formed by a side reaction from the fluorinating agent by inclusion of moisture or a volatile organic compound, from the surface of the oxide glass by the gaseous fluorinating agent continuously flowing.

In the second embodiment of the present invention, a preferred range of the pressure of the gaseous fluorinating agent in the pipe line is the same as the preferred range of the pressure of the gaseous fluorinating agent in the first embodiment of the present invention. Namely, it is preferably within a range of from 0.1 Pa to 500 kPa, more preferably from 1 Pa to 200 kPa, further preferably from 1 Pa to 100 kPa.

In a case where as the gaseous fluorinating agent, a mixed gas diluted with an inert gas is to be used, the total pressure of the mixed gas in the pipe line is preferably from 0 to 1 MPa (gauge pressure).

In the second embodiment of the present invention, the lower limit value of the temperature of the gaseous fluorinating agent in the pipe line is the same as the lower limit value of the temperature of the gaseous fluorinating agent in the first embodiment of the present invention. That is, it is preferably at least −50° C. On the other hand, the upper limit value of the temperature of the gaseous fluorinating agent is different from the first embodiment of the present invention and is not limited by the reason of the ability to adsorb hydrogen fluoride by the solid metal fluoride. Accordingly, in the second embodiment of the present invention, the temperature of the gaseous fluorinating agent can be made higher than in the first embodiment of the present invention. When the temperature of the fluorinating agent is made higher, the time for contacting the surface of oxide glass with the gaseous fluorinating agent can be made short, whereby it is possible to carry out the surface treatment of the oxide glass at a lower cost.

However, if the temperature of the fluorinating agent exceeds the melting point of the oxide glass, there may be a problem such as a deformation of oxide glass due to softening or melting of the oxide glass. Accordingly, the temperature of the fluorinating agent is preferably made to be lower than the melting point of the oxide glass to be surface-treated. For example, in the case of soda lime glass (product name: Float glass 3 mm, manufactured by Asahi Glass Company, Limited), the temperature of the gaseous fluorinating agent is preferably at most 700° C. The temperature of the gaseous fluorinating agent is more preferably from 0° C. to 650° C., further preferably from 100° C. to 600° C.

The temperature of oxide glass may be the same or different from the temperature of the gaseous fluorinating agent. For example, in a case where the oxide glass is placed on a substrate having good thermal conductivity, and the gaseous fluorinating agent is contacted while cooling the substrate, the diffusion rate of fluorine in the oxide glass decreases, and as compared with a case where no such cooling is carried out, the concentration gradient of fluorine in the oxide glass can be changed.

In the second embodiment of the present invention, the time for contacting the surface of oxide glass with the gaseous fluorinating agent is preferably from 0.1 second to one day, more preferably from one second to one hour, further preferably from one second to 10 minutes.

In the second embodiment of the present invention, it is also possible to contact the surface of the oxide glass with the gaseous fluorinating agent, while the oxide glass is moved in the pipe line. For example, oxide glass (glass ribbon) produced by a forming method such as a float process is passed through the pipe line, so that the surface of the oxide glass is contacted with the gaseous fluorinating agent. In such a case, a slow cooling furnace may be used as the pipe line. Further, in a case where the oxide glass is a substrate glass to be used for the production of solar cells, the surface of the oxide glass may be contacted with the gaseous fluorinating agent in a pipe line provided on a process line for film formation process for the production of solar cells, or an existing pipe line on such a production line. The film forming process for the production of solar cells may, for example, be a process for forming an undercoating or a transparent electroconductive film of solar cells.

As described above, in the second embodiment of the present invention, the time for contacting the surface of oxide glass with a fluorinating agent can be shortened by increasing the temperature of the gaseous fluorinating agent in the pipe line, and thus such an embodiment is suitably carried out on-line as described above.

EXAMPLES

Now, the present invention will be described in further detail with reference to Examples, but it should be understood that the present invention is by no means thereby restricted. Examples 1 to 5, 7 to 9, 11 to 12, 14 to 15 and 17 to 18 are Working Examples of the present invention, and Examples 6, 10, 13, 16 and 19 are Comparative Examples.

Evaluation Items, Evaluation Methods

Measurement 1 of Fluorine Atom Concentration in Oxide Glass

The fluorine atom concentrations at the surface and interior of oxide glass were measured by a SIMS analyzer (ADEPT1010, manufactured by ULVAC-PHI, Inc) under such conditions that primary ion: $Cs^+$, accelerating voltage: 5 kV, beam current: 100 nA, luster size: 300×300 $\mu m^2$, and sample angle: 60°. Such conditions for SIMS analysis were determined so that the etching rate would be about 1.0 nm/min, and the analytical interval was set to be 3 minutes. The fluorine atom concentration at the surface of oxide glass in Examples corresponds to an average fluorine atom concentration in a depth of up to about 3 nm from the surface of the oxide glass. The fluorine atom concentration was obtained by the SIMS analysis under the above-mentioned conditions and by preparing a calibration curve of the concentration and the relative secondary ion intensity of fluorine atoms. Here, the relative secondary ion intensity of fluorine atoms is an intensity ratio $[(^{19}F^- - ^{19}F_{BG}^-)/^{28}Si^-]$ of a value obtained by deducting a background signal intensity ($^{19}F_{BG}^-$) from a secondary ion intensity of the fluorine atoms ($^{19}F^-$), to a secondary ion intensity of silicon atoms ($^{28}Si^-$) of the matrix material. The background signal intensity ($^{19}F_{BG}^-$) was obtained by a SIMS analysis of oxide glass not containing fluorine atoms. Further, the depth from the surface was obtained by measuring the depth of a sputter crater formed by the SIMS analysis, by means of a stylus thickness meter.

Measurement 2 of Fluorine Atom Concentration in Oxide Glass

The compositions at the surface and interior of oxide glass were measured by an X-ray photoelectron spectrometer (XPS, Quantera SXM, manufactured by ULVAC-PHI, Inc). As the measuring conditions for the XPS analysis, monochromatic AlKα ray was used at 25 W as an X-ray source; the photoelectron detection area was 100 µm in diameter; the photoelectron detection angle was 45°; the pass energy was 224 eV; Ar ions were used as sputtering ions. From the respective peak intensities of elements detected by the XPS analysis, the fluorine atom concentration profile was obtained. Further, the depth from the surface was obtained from a sputter rate of a thin film estimated from the compositional profile in the depth direction obtained by an XPS analysis of a thin film with a known thickness having the same composition as the oxide glass, formed on a Si substrate by a sputtering method, under the same conditions.

Arithmetic Average Roughness (Ra)

The arithmetic average roughness (Ra) of the oxide glass surface was measured by using an atomic force microscope (Nanopics 1000, manufactured by Seiko Instruments Inc.). The measuring region was 4 µm×4 µm, and at three different portions in the same sample, the respective Ra values were measured, and their average was calculated.

Contact Angle (CA)

The contact angle of water or n-hexadecane on the surface of oxide glass was measured by using a contact angle-measuring device (product name: CA-X150, manufactured by Kyowa Interface Science Co., LTD.). It is necessary to measure a contact angle in a state where the surface to be measured is clean. As a method to clean the surface to be measured, a known cleaning method may be used within a range not to damage the surface. For example, cleaning by a solvent such as an alcohol or cleaning by light by means of an UV lamp may, for example, be mentioned. In Examples, cleaning by acetone as a solvent was adopted.

Vacuum Ultraviolet Light Transmittance

The vacuum ultraviolet light transmittance of oxide glass was measured by using a vacuum ultraviolet spectroscopic measurement device (VU-201, manufactured by Bunkoh-Keiki Co., LTD.) in a measuring wavelength region of from 180 nm to 230 nm.

Total Light Transmittance

The total light transmittance of oxide glass was measured by using a haze computer (HZ-2, manufactured by Suga Test Instruments Co., Ltd.).

Example 1

In Example 1, the first embodiment of the present invention was carried out by using the apparatus as shown in FIG. 1.

As the oxide glass, a flat plate (2 cm×2 cm×2.5 mm in thickness) of synthetic quartz glass was used. The flat plate of synthetic quartz glass was supported by a jig made of SUS 316 and put together with the jig into an autoclave made of nickel (volume: 1 L).

Then, 15 g of NaF pellets (manufactured by STELLA CHEMIFA CORPORATION) were introduced into the autoclave so that they would not contact the synthetic quartz glass plate. Then, the autoclave was heated from the exterior by using an oil bath to raise the temperature from room temperature to 80° C. at a temperature raising rate within a range of from 0.5 to 2° C./min.

Then, while the interior of the device was maintained at 80° C., vacuum degassing was carried out until the pressure in the apparatus became not higher than 266 Pa and held for one hour. This operation was intended to remove the included organic impurities, moisture, etc. However, even if this operation is carried out, the included organic impurities, moisture, etc. cannot be completely removed, and when the gaseous fluorinating agent is introduced, the fluorinating agent will react with such included substances to form hydrogen fluoride as a byproduct. The hydrogen fluoride formed as a byproduct is adsorbed by NaF to control the concentration of hydrogen fluoride to be at most 1 mol % at the surface of the synthetic quartz glass in contact with the gaseous fluorinating agent.

Then, as a gaseous fluorinating agent, a gas of an elemental fluorine ($F_2$) diluted to 1 mol % with high purity nitrogen gas having a dew point of at most −60° C. (hereinafter, referred to as the diluted fluorine gas) was introduced until the pressure in the apparatus became 0.18 MPa by gauge pressure. After the introduction of the diluted fluorine gas, the system was maintained for one hour to introduce fluorine to the surface of the quartz glass.

Figure 2:
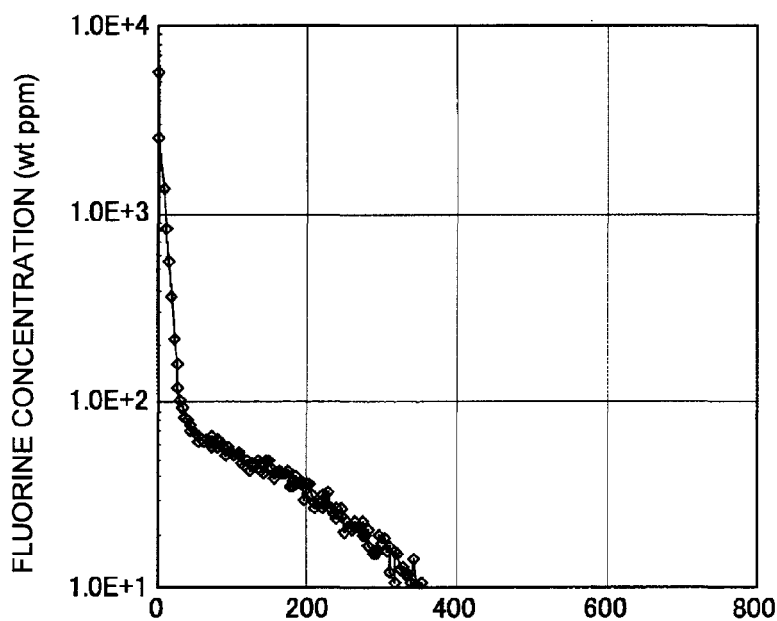
FIG. 2 is a graph showing a profile of the fluorine atom concentration of the synthetic quartz glass having fluorine introduced in its surface in Example 1.

The fluorine atom concentration in the synthetic quartz glass having fluorine introduced to its surface was quantified by the above-described method of measurement 1 of fluorine atom concentration in oxide glass, and the results are shown in FIG. 2. From FIG. 2, it is observed that the fluorine atom concentration in the fluorinated synthetic quartz glass was such that the fluorine atom concentration at the surface was 0.6 wt %, and the fluorine atom concentration gradually decreased from 0.6 wt % to 10 wt ppm to a depth of 0.4 µm in the direction of depth from the surface.

Further, the contact angles of n-hexadecane and water on the surface of the synthetic quartz glass having fluorine introduced to its surface, were measured by the above-described method, whereby the contact angle of n-hexadecane was 21°, and the contact angle of water was 25°. This result indicates that hydrophilicity was imparted to the surface of the synthetic quartz glass, and as a result, the oil repellency was improved.

Further, the arithmetic average roughness (Ra) of the synthetic quartz glass having its surface fluorinated, was measured by the above-described method, whereby Ra was 0.3 nm.

Further, the vacuum ultraviolet light transmittance was measured by the above-described method, whereby the transmittance at a wavelength of 193 nm was 91.0%.

Examples 2 to 5

The fluorine atom concentration at the surface, the contact angles (n-hexadecane, water) and the vacuum ultraviolet light transmittance were evaluated by carrying out the operation in the same manner as in Example 1 except that the concentration of $F_2$ contained in the gaseous fluorinating agent, the temperature of the gaseous fluorinating agent and the time for contacting the synthetic quartz glass with the gaseous fluorinating agent, were changed as identified in Table 1.

The temperature was adjusted by raising or lowering it to the prescribed temperature at a rate within a range of from −2 to 2° C./min. The results are shown in Table 1. Further, the HF concentration is determined by the concentration of $H_2O$ as an impurity in the gas, and from the $H_2O$ concentration as calculated from the dew point, it is evident that the HF concentration is less than 1 mol %.

Example 6

Without contacting the same flat plate of synthetic quartz glass as used in Example 1 with the gaseous fluorinating agent, the fluorine atom concentration at the surface, the contact angles (n-hexadecane, water) and the vacuum ultraviolet light transmittance were evaluated. The results are shown in Table 1.

Here, in Example 6, the fluorine concentration at the synthetic quartz glass surface was essentially 0 ppm.

Further, the contact angles of n-hexadecane and water on the surface of the synthetic quartz glass were measured, whereby the contact angle of n-hexadecane was 6°, and the contact angle of water was 34°. This result indicates that no hydrophilicity was imparted to the surface of the synthetic quartz glass, and as a result, the oil repellency was not improved.

Further, the arithmetic average roughness (Ra) of the surface of the synthetic quartz glass in Example 6 was measured, whereby Ra was 0.2 nm.

Further, the vacuum ultraviolet light transmittance of the synthetic quartz glass in Example 6 was measured, whereby the transmittance at a wavelength of 193 nm was 90.6%.

and the total light transmittance of oxide glass was evaluated by the above-described method. Further, the temperature was adjusted by raising or lowering it to the prescribed temperature at a rate within a range of from −2 to 2° C./min. The results are shown in Table 2.

TABLE 2

|  |  | Ex. 7 | Ex. 8 | Ex. 9 | Ex. 10 |
|---|---|---|---|---|---|
| Treating conditions | $F_2$ concentration (mol %) | 20% | 20% | 20% | Not treated |
|  | Temperature (° C.) | 80 | 20 | 20 | Not treated |
|  | Contact time (hr) | 1 | 1 | 4 | Not treated |
| Fluorine atom concentration at the surface (wt %) |  | Not measured | Not measured | 52% | 0% |
| Contact angle | Water (°) | 19 | 25 | 10 | 37 |
| Total light transmittance |  | 95.6% | 94.7% | 95.3% | 90.9% |

Examples 11 to 13

The fluorine atom concentration at the surface was evaluated by carrying out the operation in the same manner as in Example 1 except that instead of the synthetic quartz glass, particles (particle size: 20 μm) of borosilicate glass having the composition as identified in Table 3 were used; the concentration of $F_2$ contained in the gaseous fluorinating agent, the temperature of the gaseous fluorinating agent and the time for contacting the surface of borosilicate glass with the gaseous fluorinating agent were changed as identified in Table 4; the fluorine atom concentration at the surface was evaluated by the method of measurement 2 of fluorine atom concentration of oxide glass. The results are shown in Table 4.

TABLE 1

|  |  | Ex. 1 | Ex. 2 | Ex. 3 | Ex. 4 | Ex. 5 | Ex. 6 |
|---|---|---|---|---|---|---|---|
| Treating conditions | $F_2$ concentration (mol %) | 1% | 1% | 1% | 1% | 20% | Not treated |
|  | Temperature (° C.) | 80 | 110 | 130 | 150 | 80 | Not treated |
|  | Contact time (hr) | 1 | 1 | 1 | 1 | 1 | Not treated |
| Fluorine atom concentration at the surface (wt %) |  | 0.3% | 0.2% | 0.7% | 0.4% | 0.6% | 0% |
| Contact angle | n-hexadecane (°) | 21 | 26 | 25 | 28 | 20 | 6 |
|  | Water (°) | 25 | 19 | 18 | 19 | 26 | 34 |
| Vacuum ultraviolet light transmittance (193 nm) |  | 91.0% | 92.5% | 94.2% | 93.6% | 92.6% | 90.6% |

Examples 7 to 10

The fluorine atom concentration at the surface, the contact angle of water and the vacuum ultraviolet light transmittance were evaluated by carrying out the operation in the same manner as in Example 1 except that instead of the synthetic quartz glass, a flat plate (5 cm×10 cm×3.0 mm in thickness) of soda lime glass was used; the concentration of $F_2$ contained in the gaseous fluorinating agent, the temperature of the gaseous fluorinating agent and the time for contacting the surface of soda lime glass with the gaseous fluorinating agent, were changed as identified in Table 2; and the fluorine atom concentration at the surface was evaluated by the method of measurement 2 of fluorine atom concentration of oxide glass,

TABLE 3

|  | Composition (mol %) |
|---|---|
| $SiO_2$ | 37 |
| $B_2O_3$ | 32.5 |
| ZnO | 15 |
| $Al_2O_3$ | 2.5 |
| $Na_2O$ | 5.5 |
| $K_2O$ | 7.5 |

TABLE 4

|  |  | Ex. 11 | Ex. 12 | Ex. 13 |
|---|---|---|---|---|
| Treating conditions | $F_2$ concentration (mol %) | 20% | 20% | Not treated |
|  | Temperature (° C.) | 20 | 20 | Not treated |
|  | Contact time (hr) | 1 | 8 | Not treated |
| Fluorine atom concentration at the surface (wt %) |  | 17% | 18% | 0 |

Examples 14 to 16

The fluorine atom concentration at the surface, the contact angle of water and the total light transmittance were evaluated by carrying out the operation in the same manner as in Example 1 except that instead of the synthetic quartz glass, a flat plate (2 cm×2 cm×1.0 mm in thickness) made of alkali-free glass (AN100, manufactured by Asahi Glass Company, Limited) was used in Examples 14 and 16, and particles (particle size 20 μm) of alkali-free glass (AN100, manufactured by Asahi Glass Company, Limited) were used in Example 15; the concentration of $F_2$ contained in the gaseous fluorinating agent, the temperature of the gaseous fluorinating agent and the time for contacting the surface of alkali-free glass with the gaseous fluorinating agent were changed as identified in Table 5; the fluorine atom concentration at the surface was evaluated by the method of measurement 2 of fluorine atom concentration of oxide glass, and the total light transmittance of oxide glass was evaluated by the above-described method. The results are shown in Table 5.

TABLE 5

|  |  | Ex. 14 | Ex. 15 | Ex. 16 |
|---|---|---|---|---|
| Treating conditions | $F_2$ concentration (mol %) | 20% | 20% | Not treated |
|  | Temperature (° C.) | 20 | 80 | Not treated |
|  | Contact time (hr) | 1 | 8 | Not treated |
| Fluorine atom concentration at the surface (wt %) |  | Not measured | 47% | 0 |
| Contact angle | Water (°) | 25 | Not measured | 38 |
| Total light transmittance |  | 92.5% | Not measured | 92.0% |

Examples 17 to 19

Figure 3:
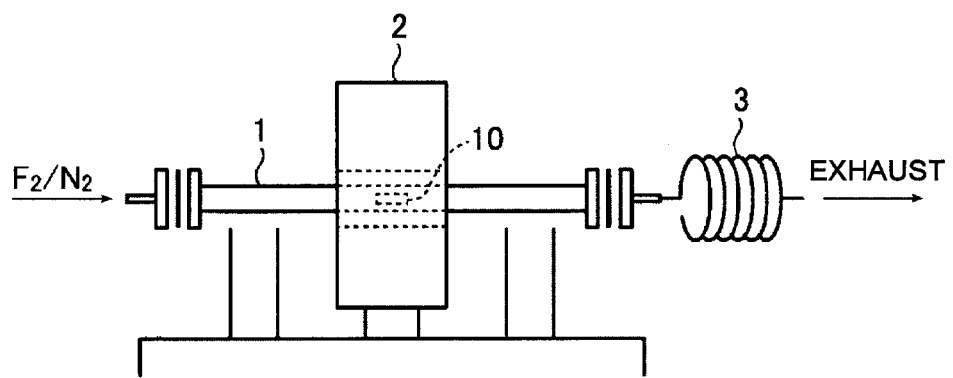
FIG. 3 is a schematic view of an apparatus used for contacting the surface of oxide glass with a gaseous fluorinating agent in Example 17.

In Examples 17 to 19, the second embodiment of the present invention was carried out by using the apparatus as shown in FIG. 3. The apparatus shown in FIG. 3 has a pipe line 1 wherein the gaseous fluorinating agent is permitted to flow. A portion of the pipe line 1 is put in a heater 2. On the downstream side of the pipe line 1, a cooling means 3 is provided to cool the gaseous fluorinating agent discharged from the pipe line 1. Oxide glass 10 is set by means of a jig in the pipe line 1 at the portion put in the heater 2. As the jig, a flat plate made of synthetic quartz glass is used, and the side of oxide glass 10 which is in contact with the synthetic quartz glass will not substantially be fluorinated.

After a flat plate (2 cm×2 cm×1.0 mm in thickness) made of soda lime glass was set as oxide glass 10 in the pipe line 1, the temperature in the pipe line 1 was heated to the temperature as identified in Table 6 at an average temperature rising rate of 15° C./min by using the heater 2 while the interior of the pipe line 1 was purged with nitrogen gas. Then, as the gaseous fluorinating agent, a diluted fluorine gas ($F_2$ concentration: 2 mol %) was supplied at a flow rate as identified in Table 6. After a lapse of the predetermined time, the interior of the pipe line 1 was substituted and cooled, and the oxide glass 10 was taken out. The fluorine atom concentration at the surface, the contact angle of water and the total light transmittance were evaluated in the same procedure as in Example 1 except that the fluorine atom concentration at the surface was evaluated by the method of measurement 2 of fluorine atom concentration of oxide glass, and the total light transmittance of oxide glass was evaluated by the above-described method. The results are shown in Table 6.

TABLE 6

|  |  | Ex. 17 | Ex. 18 | Ex. 19 |
|---|---|---|---|---|
| Treating conditions | $F_2$ concentration (mol %) | 2% | 2% | Not treated |
|  | Volume flow rate (Ncc/min) | 220 | 224 |  |
|  | Temperature (° C.) | 550 | 600 | Not treated |
|  | Contact time (hr) | 15 | 15 | Not treated |
| Fluorine atom concentration at the surface (wt %) |  | 4% | 1% | 0 |
| Contact angle | Water (°) | 18 | 19 | 37 |
| Total light transmittance |  | 91.7% | 91.6% | 90.7% |

INDUSTRIAL APPLICABILITY

The method for treating the surface of oxide glass of the present invention is useful, since it is capable of treating the surface of oxide glass for fluorination at low cost and with excellent adhesiveness, without bringing about deterioration of the surface properties by an excessive etching action.

The entire disclosures of Japanese Patent Application No. 2007-162921 filed on Jun. 20, 2007 and Japanese Patent Application No. 2007-191009 filed on Jul. 23, 2007 including specifications, claims, drawings and summaries are incorporated herein by reference in their entireties.

What is claimed is:

1. The method for treating the surface of oxide glass comprising contacting the surface of oxide glass with a mixed gas comprising elemental fluorine as a fluorinating agent diluted with an inert gas, wherein a dew point of said inert gas is at most −10° C., wherein a concentration of hydrogen fluoride at the surface of oxide glass with which said mixed gas is in contact, is controlled to be at most 1 mol% by carrying out the procedure of contacting the surface of oxide glass with said mixed gas, in a closed container containing said mixed gas and a solid metal fluoride, wherein a temperature of said mixed gas is within a range of from −50 to 300° C.

2. The method for treating the surface of oxide glass according to claim 1 wherein said inert gas is at least one gas selected from the group consisting of nitrogen, helium and argon.

3. The method for treating the surface of oxide glass according to claim 1, wherein said surface of oxide glass is contacted with a mixed gas having a fluorinating agent diluted with an inert gas comprising nitrogen and wherein a concentrate of said elemental fluorine is from 100 mol ppm to 50 mol %.

4. The method for treating the surface of oxide glass according to claim 1, wherein said surface of oxide glass is contacted with a mixed gas having a fluorinating agent diluted with an inert gas comprising nitrogen and wherein a concentrate of said elemental fluorine is from 1,000 mol ppm to 20 mol %.

5. The method for treating the surface of oxide glass according to claim 1, wherein said temperature of said gas or mixed gas is within a range of from −20 to 250° C.

6. The method for treating the surface of oxide glass according to claim 1, wherein a dew point of said inert gas is at most −40° C.

7. The method for treating the surface of oxide glass according to claim 1, wherein a dew point of said inert gas is at most −60° C.

8. The method for treating the surface of oxide glass comprising contacting the surface of oxide glass with or a mixed gas comprising elemental fluorine as a fluorinating agent diluted with an inert gas, wherein a dew point of said inert gas is at most −10° C., wherein a concentration of hydrogen fluoride at the surface of oxide glass with which said mixed gas is in contact, is controlled to be at most 1 mol % by carrying out a procedure of contacting the surface of oxide glass with said mixed gas in a gas phase by setting the oxide glass in a pipe line in which said mixed gas continuously flows,
wherein a temperature of said mixed gas is within a range of from −50 to 700° C.

9. The method for treating the surface of oxide glass according to claim 8, wherein said temperature of said mixed gas is within a range of from 0 to 650° C.

10. The method for treating the surface of oxide glass according to claim 8, wherein said temperature of said gas or mixed gas is within a range of from 100 to 600° C.

11. The method for treating the surface of oxide glass according to claim 8, wherein said inert gas is at least one gas selected from the group consisting of nitrogen, helium and argon.

12. The method for treating the surface of oxide glass according to claim 8, wherein said surface of oxide glass is contacted with a mixed gas having a fluorinating agent diluted with an inert gas comprising nitrogen and wherein a concentrate of said elemental fluorine is from 100 mol ppm to 50 mol %.

13. The method for treating the surface of oxide glass according to claim 8, wherein said surface of oxide glass is contacted with a mixed gas having a fluorinating agent diluted with an inert gas comprising nitrogen and wherein a concentrate of said elemental fluorine is from 1,000 mol ppm to 20mol%.

14. The method for treating the surface of oxide glass according to claim 8, wherein a dew point of said inert gas is at most −40° C.

15. The method for treating the surface of oxide glass according to claim 8, wherein a dew point of said inert gas is at most −60° C.

* * * * *